United States Patent [19]

Keszei et al.

[11] 4,433,485
[45] Feb. 28, 1984

[54] MEASUREMENT OF THE DIMENSIONS OF FOOTWEAR LASTS

[75] Inventors: Jenő Keszei; László Varga; Jenő Donáth, all of Budapest, Hungary

[73] Assignee: Múbőr és Cipőipari Bor, Budapest, Hungary

[21] Appl. No.: 423,947

[22] Filed: Sep. 27, 1982

Related U.S. Application Data

[63] Continuation of Ser. No. 295,238, Aug. 21, 1981, abandoned, which is a continuation of Ser. No. 123,421, Feb. 21, 1980, abandoned, which is a continuation of Ser. No. 973,082, Dec. 26, 1978, abandoned, which is a continuation of Ser. No. 793,790, May 5, 1977, abandoned.

[30] Foreign Application Priority Data

May 14, 1976 [HU] Hungary ............................ BOP 1614

[51] Int. Cl.³ .......................... G01B 5/20; A43D 1/00
[52] U.S. Cl. ......................................... 33/3 R; 33/5; 33/6; 33/174 P
[58] Field of Search ................. 33/3 R, 3 A, 3 B, 3 C, 33/4, 5, 6, 174 P, 180 R; 12/126

[56] References Cited

U.S. PATENT DOCUMENTS

| | | | |
|---|---|---|---|
| 506,761 | 10/1893 | Adler et al. | 33/3 B |
| 526,849 | 10/1894 | Adler | 33/3 B |
| 1,404,545 | 1/1922 | Richardson | 33/174 P |
| 2,672,690 | 3/1954 | Crook | 33/174 P |

FOREIGN PATENT DOCUMENTS 1221962 2/1971 United Kingdom ................. 33/3 R

*Primary Examiner*—Richard R. Stearns
*Attorney, Agent, or Firm*—Gabriel P. Katona

[57] ABSTRACT

A process and apparatus for the measurement of the dimensions of footwear lasts and for determining reference directions for measurement and manufacture are described. Horizontal and vertical projection tracings are made from a master last, by a mechanical sensing-following mechanism combined with an optical projection system. Deviations from desired positions are rectified by displacing the last, in at least two directions. The location and magnitude of deviations can be marked on the last.

8 Claims, 16 Drawing Figures

MEASUREMENT OF THE DIMENSIONS OF FOOTWEAR LASTS

This is continuation of Ser. No. 295,238, filed Aug. 21, 1981, which is continuation of 123,421, filed Feb. 21, 1980, which is continuation of 973,082, filed Dec. 26, 1978, which is continuation of 793,790, filed May 5, 1977, all abandoned.

BACKGROUND OF THE INVENTION

1. Field of the Invention

This invention concerns a process and apparatus for examining the dimensions of shoe-lasts, for determining the directions defining or determining the measurements and the manufacturing process by forming projection drawings.

2. Description of the Prior Art

Current large-scale footwear manufacture employs numerous tools which follow the shape of a last. Prefabricated components are widely used, which are frequently obtained from other firms or enterprises. The use of injection moulding technology and of prefabricated sole shapes has become particularly widespread. An international agreement has been reached for conversion to the metric system. With this, an agreement on dimensions or sizes between various enterprises has become inevitable, as have uniform or single interpretation of dimensions and standardisation.

The fundamental determinant of dimensions is the last and the different components such as insole, sole, heel, upper etc., are based on this.

It is a fundamental requirement that the dimensions of these various components should be coordinated or harmonised with a relatively high accuracy. The different sizes cause a special problem because they grow or reduce in a geometrical, rather than arithmetical, progression relative to a predetermined mean value.

The shape of a last generally follows the shape of a foot and its dimensions could only be characterised mathematically by an infinite number of data. In current practice, however, even the determination of a few extremely important main dimensions, and their monitoring, causes a severe problem to experts. In practice, the number of measurements performed result in as many different sizes because the direction of the measurement cannot by simple means be indicated unambiguously and reproducibly. The published patents in this field have as a chief common characteristic that they emphasise size drawings; these known patents include some by the inventors of the present invention. In other words, these devices provide information about the distribution of measurements or sizes within a given last, but the comparison of different lasts and types performed with them results in a large error percentage. The significance of the direction of measurement has already been recognised both by the present inventors and by others. In the interest of reproducibility of the direction of measurement, special direction-determining devices have been constructed. The chief characteristic of these devices can be summarised in that the known and tabulated spatial relationships of a few characteristic points of a last are adjusted or set by intricate devices and the last is then fitted to these measurement points. Such devices have only come into moderate use because their handling and use is complicated, their manufacture is expensive, and also because the coordination of just a few points still only gives very little information about the spatial configuration of a complicated last shape. However, to increase the number of measurement points makes it impossible to fit the last and to allow it to be observed.

One must also reckon with the fact that a separate direction indicating device also has its own separate inherent measurement error.

For the above reasons, the inventors have already attempted to construct a mechanism which, in addition to the control and registration or recordal of a large number of dimensions, also attempted to indicate the measurement direction for different lasts in one apparatus. But these mechanisms also have had the defect that they operated by using measurement points and that they presuppose the existence of an accurate insole master or template which had to be laid on the sole surface of the last. Unfortunately, practice has shown that one could not obtain sufficient accuracy with this apparatus and a further problem is caused by the fact that the curvature or tip bend of the last may vary. Furthermore, one could not decide the appropriateness of the different sizes of the series and one could not determine the errors in displaying a series.

We have already recognised earlier that not only the control but also the manufacture should be performed with a constant predetermined spatially-directed last gripping if we wish to manufacture end sizes of the same dimensions even where the display of the series took place from completely identical master lasts. The designing and dimensioning of the last series cannot therefore be exhausted by comparing the identity of or the differences between two types of models.

The individual dimensions of the components can only be completely harmonised and coordinated if the direction of the manufacture and dimensional control of the last series are identically selected.

SUMMARY OF THE PRESENT INVENTION

With the method and apparatus described herein, the applicants believe they may have succeeded in indicating deviations of ±0.2 mm. between two lasts and to measure and register distortions of end sizes or numbers of last series manufactured according to present practice, which hitherto have been assumed to be identical. For instance, it has been possible to show that during evolving the series, lastmakers have been operating with a ±5° directional deviation or error. The result of the end number distortions in a footwear factory showed up as error or mismatch at the junctions of different components.

It can be verified with economic considerations also that it is worthwhile paying greater attention and care to the dimensions and their harmonisation.

With the method and apparatus described and claimed herein, it has been possible to orient and dimension the lasts within a single apparatus and to substitute the known "measuring point system" with a system containing much more information, e.g. more by an order of magnitude, by the use of projection drawings or tracings of measurement points.

In this way, a possibility has been created for the man skilled in the art to obtain, possibly from a central store or location, the drawings or tracings of models having standard back parts and to shape their models to this without the use of complicated tables and data. As regards the last manufacturer, the direction of manufacture can be indicated or determined to enable them to design their own components to fit thereto.

BRIEF DESCRIPTION OF THE DRAWINGS

A preferred embodiment of the apparatus and method are described below with reference to the accompanying drawings, wherein.

DESCRIPTION OF THE PREFERRED EMBODIMENTS

Figure 1:
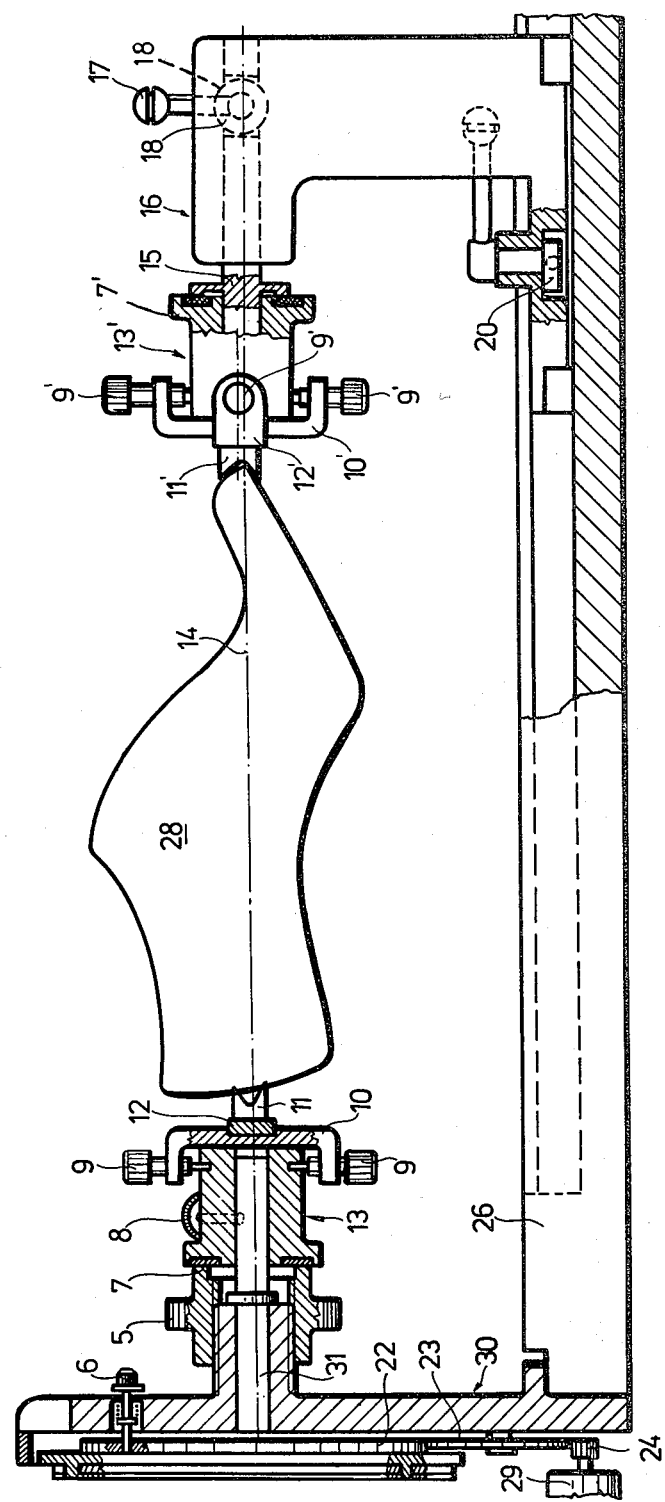
FIG. 1 illustrates, partly in section and partly in elevation, a last-holding device.

Referring to FIG. 1 which shows the holding or gripping of the last in the apparatus, there are two main units, namely the heel holder 30 and the hose or tip holder 16. These two units are held together by a frame 26 such that the heel holder is fixed while the tip holder is displaceable parallel to an axis of rotation 14 and can be fixed in the path of the axis of rotation by means of an eccentric 20. A shaft 31 is journalled in the heel holder unit 30 and has one end fixed to a pitch disc 22 and a transverse writing table 2 while the other end of the shaft is free and has a bracket to carry the heel holder 13.

The shaft 31 is axially fixed in the direction of the axis of rotation 14, but can be rotated about its own axis of rotation manually or by means of a motor 29 via toothed pitch discs 22, 23, 24. In addition, the shaft 31 can be locked in positions offset by 90° by means of a bolt 6 and the pitch disc 22. This ensures the displacement of the last by 90° exactly.

A shaft 15 is so journalled in the tip holder 16 that its rotation is prevented by an eccentric 18, but its axial displaceability is ensured by rotating an arm 17. The tip-holding mechanism 13' is disposed on the shaft 15 and is axially supported on a bearing 7' upon the shaft. The heel holder 13 and the tip holder 13' differ only in that the heel holder 13 can be fixed on, and released from, the shaft 31 by means of a screw 8 while the tip holder 13' rotates freely on the shaft 15. Both last holding devices 13 and 13' are provided with a cross-support device 10, 12 to ensure the mutually independent adjustability of the tips 11, 11' in horizontal and vertical directions, these displacements or adjustments being carried out by means of screws 9.

In this way, the last placed in any arbitrary manner between the holding tips 11 and 11' can be so fixed that the heel as well as the tip can, after gripping, be displaced vertically and horizontally relative to the axis of rotation 14.

The last 28 may in addition also be displaced in the direction of the axis of rotation 14. This movement can be achieved after releasing the eccentric 20, slackening the screw 8 and rotating a tapped gear 5.

If a given position is fixed on the pitch disc 22 then the last may, after slackening the screw 8, be rotated also about its long axis and in this way its position can by synchronised with the writing table 2.

With the devices described above, the last may in practice be displaced in any desired direction along three axes after its gripping and can be adjusted to a predetermined position of the coordinate system. Naturally, the above-described free or arbitrary adjustment should be understood to mean adjustment within a relatively narrow range.

The above-described holding or clamping of the last and its adjustment in any desired manner in the coordinate system represents a very important part of the present invention, but it is in itself not a sufficient criterion. Nevertheless it must be understood that this solution in principle in combination with position-sensing devices formed according to this principle enable the sizes or dimensions of lasts in a predetermined direction to be measured and recorded and to make it possible to mark on the last the positions of deviations or errors and their magnitudes.

Figure 2:
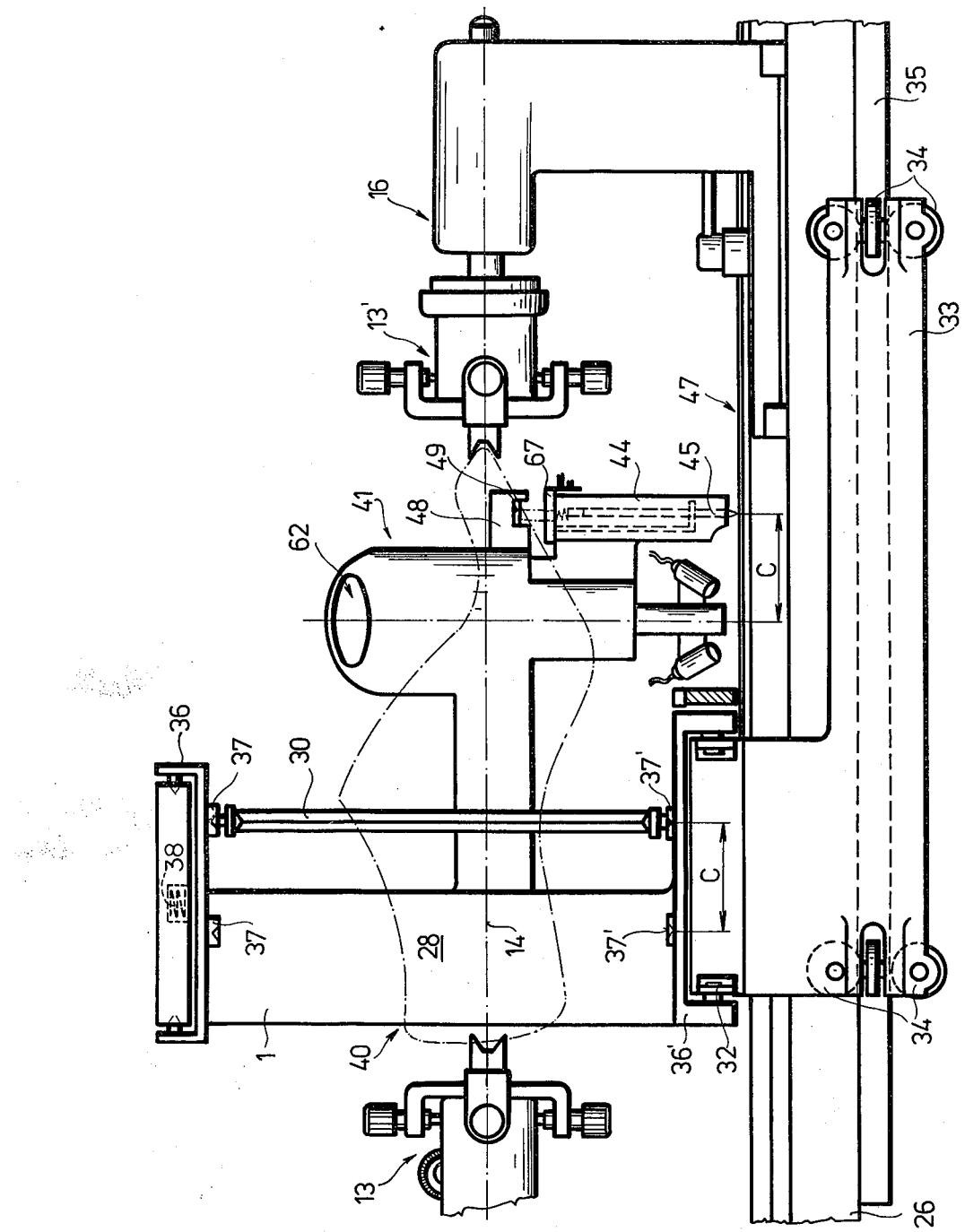
FIG. 2 shows, in elevation, a copying or following device.
Figure 9:
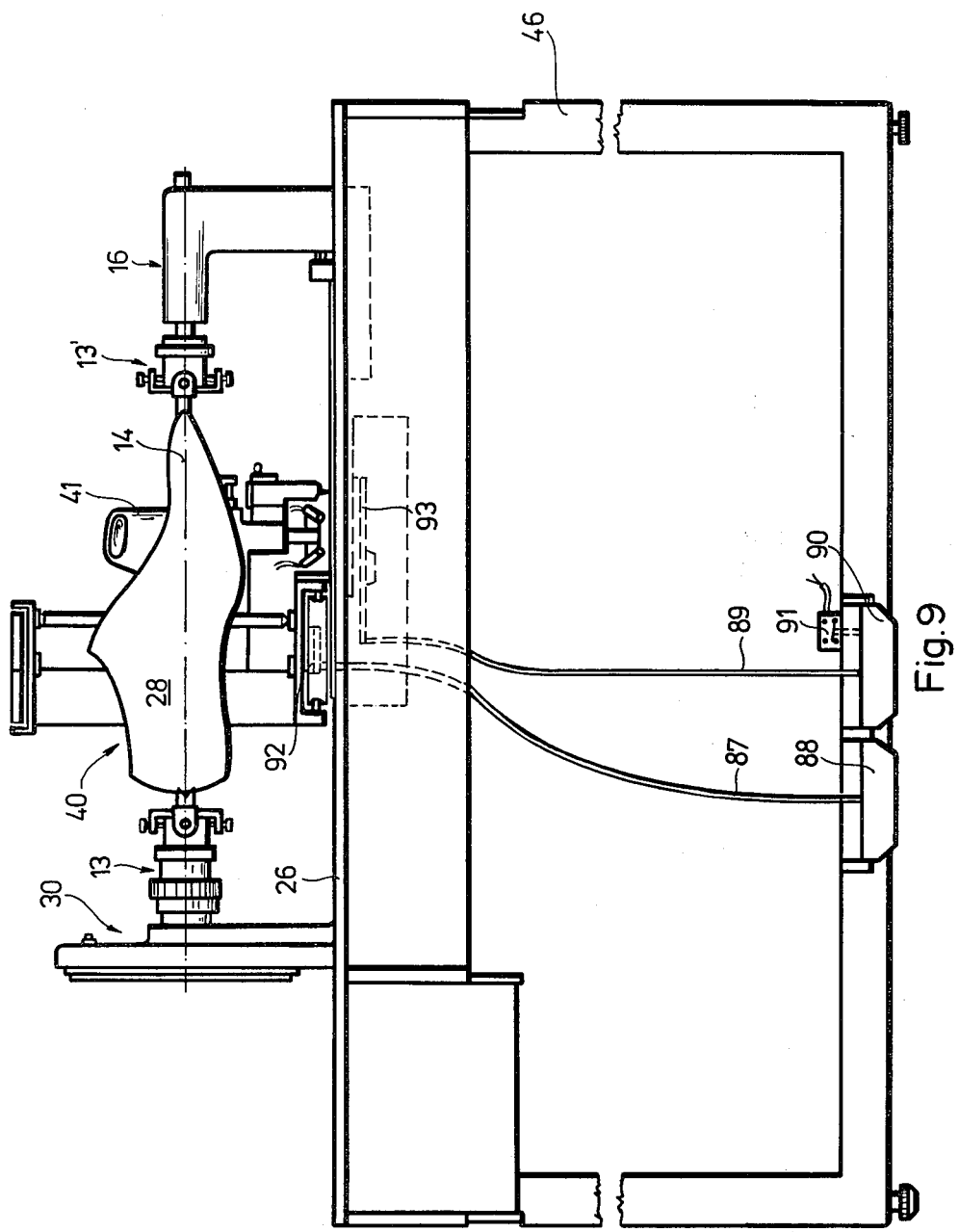
FIG. 9 shows a complete apparatus in front elevation.
Figure 10:
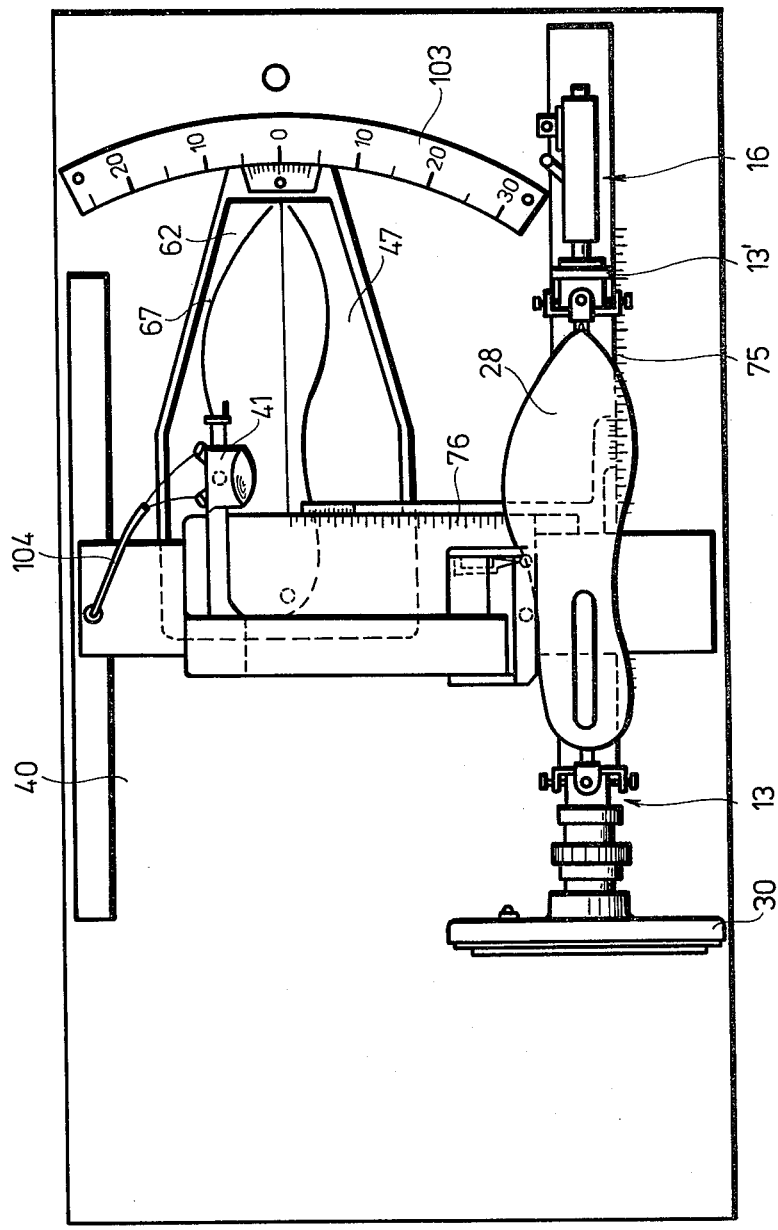
FIG. 10 shows a complete apparatus in plan view.

The position-sensing and recording device associated with the last is shown mainly in FIG. 2, while its connection with the clamped last is shown in FIGS. 9 and 10.

The position-sensing and recording apparatus consists of a combination of a "longitudinal" car 33 guided for linear movement along the longitudinal direction 14 of the last, a "transverse" car 40 guided for movement on the longitudinal car 33 at right angles to the longitudinal direction, a projector 41 mounted on the transverse car 40, a pen 45 and exchangeable (replaceable) feeler inserts 81 or 70. The cars 33, 40 expediently run along straight paths 35 which are finely machined and which are engaged by the cars by wheels or bearings 32 and 34. The transverse car 40 has a U-shaped bracket which encompasses the last 28 on three sides, namely from below, from the back and from above. Into the open front side of the bracket the contour feeler insert 81 or the plane feeler 70 may be introduced. The feeler inserts are coupled at the top and at the bottom to the transverse car 40 by conical bearings 36', 37. To facilitate exchange, the upper bearing 37 locks resiliently by means of spring 38 through a holder 36.

The projector 41 and the pen 45 are disposed at a distance c from each other and are so fixed to the rear holder on the transverse car 40 that the field of view of the objective 61 and the pen 45 should be on the free surface of the longitudinal writing table 47, unobstructed by the transverse car 40.

From the description of the position sensing and recording device it follows that the surface projection or plane section of the last sensed by the silhouette insert 81 or the plane section insert 70 can be drawn by the pen 45 in the proportion 1:1 on the writing table 47 by means of a continuous line. From the drawn projections, a man skilled in the art can judge whether the last has been clamped into the apparatus relative to its axis of rotation in accordance with the desired intention. Insofar as deviations are experienced, the heel holder 13 and the tip holder 13' and the screw-threaded wheel 5 can be used to perform corrections. Corrections may only be made in the direction of the plane of writing table 47. For the exact spatial adjustment it is necessary to rotate the last by 90° by means of the pitch disc 22. After axial adjustment of the last by means of the part 5, horizontal adjustment by means of the part 12 and its vertical adjustment by means of the part 10, one can for instance ensure that the last is made identical with a previously drawn contour line on the writing table 47. If one desired to display the identity of or deviations between the two lasts, then one draws the horizontal and vertical projections of one last, whereafter the last under examination is oriented as described above in the apparatus with the aid of the projector. Naturally equivalent sections and projections are compared.

Figure 5:
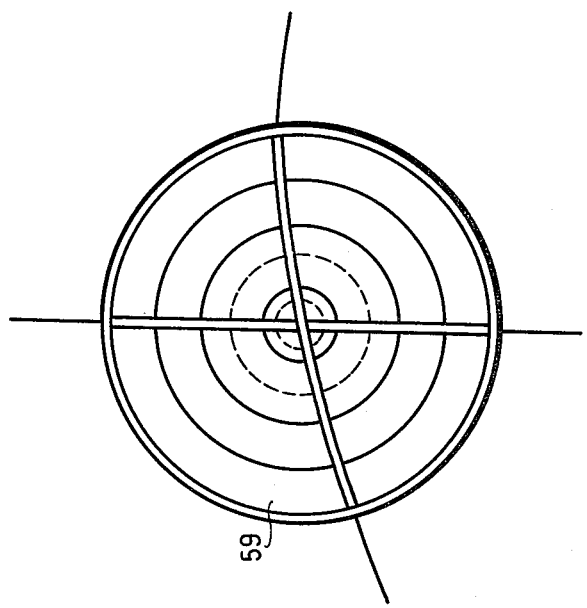
FIG. 5 illustrates the field of view in the projector.

Since the pen 45 and the intersection of the hairlines in the projector (FIG. 5) are spaced by a distance c, when adjusting with the projector, the appropriate insert 70 or 81 is placed at a distance c from the drawn position into the transverse car 40. Thus the drawings taken of the last can be done by putting the feeler inserts into the right-hand bearing housing 37, and when making control measurements from the drawing to the last, they are placed in the left hand-bearing housing.

In the case of the last being examined, the feeler insert is guided along the length of the last and the deviations are observed in the field of view of the projector. The concentric rings formed in the field of view also give rise to the possibility of measuring the magnitude of deviation. Naturally for different lasts one must alway know which are the points and surfaces which must be identical in all cases, and the deviations are only measured after these have been set. For instance, the model as well as the last to be examined should always be the same heel height and walking plane.

From what has been described above, it follows that the invention concerns a system which has a dual function. It ensures that the last can be held or clamped in a pre-programmed position and at the same time it can provide for the recording of different projections and sections, and their dimensions, on a sheet placed on the drawing table. On the other hand, it also allows marking the last with the location and size of deviations from prescribed dimensions. In this way, the standard model or models can be reproduced. The reproducibility of the standard model or models does not represent in practice a problem even where changes are made on the models, i.e. when the shape of the tip is changed, since the remaining back parts of the last are identified and the changed tip is set where it is most expedient in the interests of the identity of the back parts.

Our researches have shown that the above-described system is, by virture of its simple construction, and with the aid of the various simple complementary devices, suitable for solving various other problems connected with the size of the last.

One such requirement is the orientation of the individual members of a last series on the basis of the dimensions drawn of a mean number or size. To this end, it is expedient to provide for the displacement of the cars 40, 33 to be measured by a millimeter division scale and a Vernier scale and the thus-formed coordinate system (FIG. 16) should be so chosen that the x-coordinate should correspond to the axis of rotation 14, the z-coordinate should pass through the heel point of the last. It is expedient also to construct the cars to be fixable in any position. This task is taken care of by foot pedals 88 and 90 such that by the intermediation of cables 87 and 89 brake callipers or arms 92 and 93 exert a braking force longitudinally on the frame 26 and transversely on the car 33. Accordingly, by depressing the pedal 88 the copying or following device can be used to construct transverse straight lines while depression of the pedal 90 allows the construction of longitudinal straight lines.

An electromagnet 48 is mounted above the pen which is energised by the simultaneous depression of both pedals and causes the pen to engage. In this way the measurement and registration of any coordinate point may take place. It is further expedient to render the writing table 47 rotatable about the point of intersection of the z and x-coordinates indicated by a point of rotation about an angular scale 103 (FIG. 10) so that not only perpendicular parallel straight lines but also oblique straight lines may be constructed, e.g. the tangents bounding the lasts.

Figure 16:
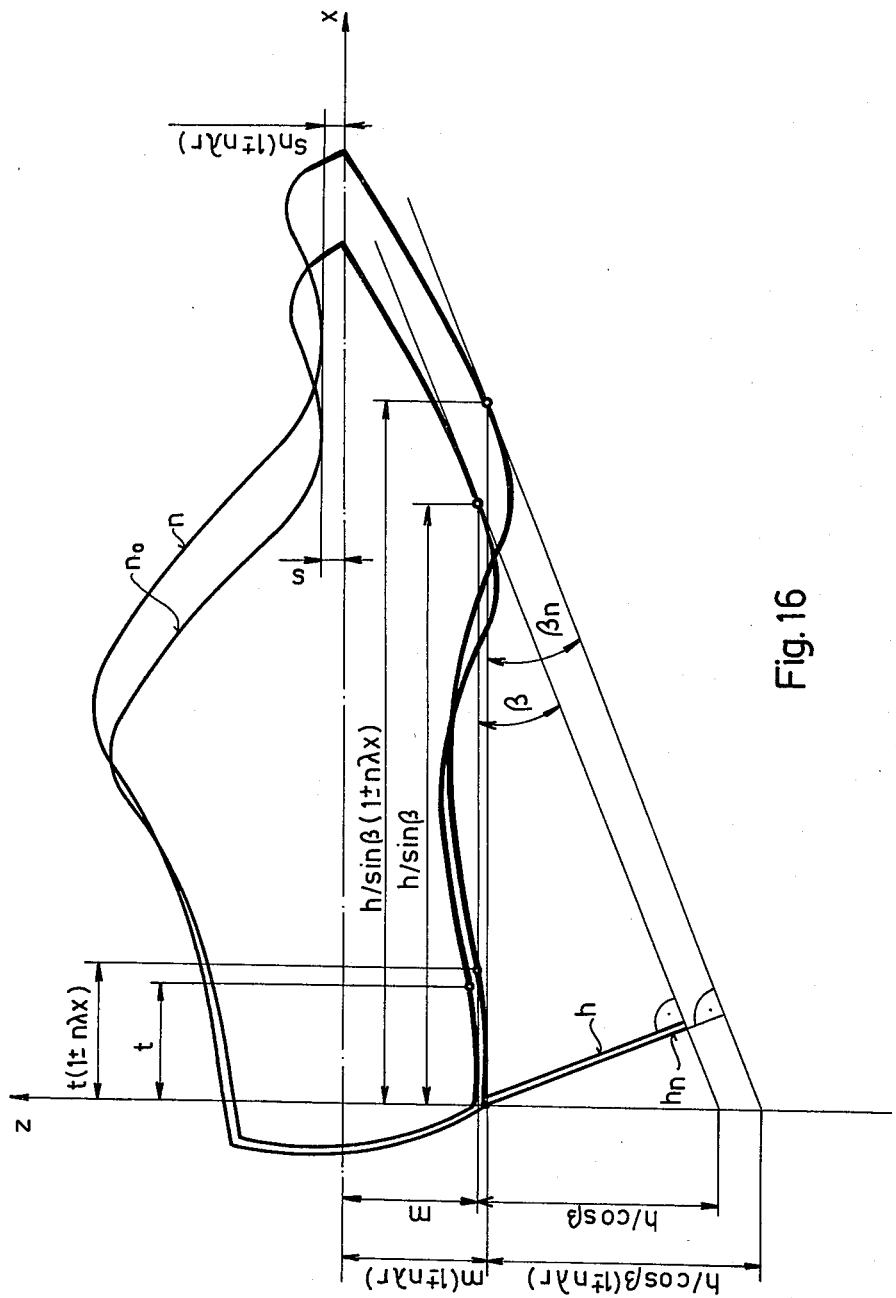
FIG. 16 illustrates variations in principle that may occur in a last series.

FIG. 16 shows by way of example the magnification relationships between an average-sized last (n=0) and another last deviating therefrom by size n. If therefore one knows the parameters of the drawing of the model of average size, then all the data, for instance tangents and points, required for limiting or orienting any member of the series and the series itself can be tabulated. This can be displayed on a sheet and then any member of the series can be oriented and its dimensions checked as the dimensions rarely change during developing the series.

Figure 13:
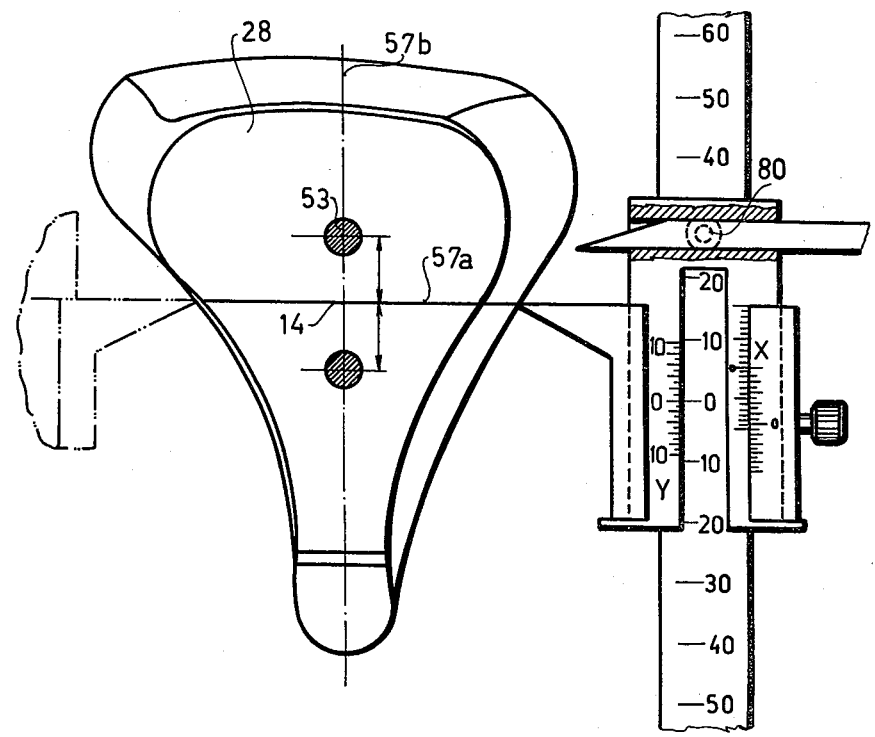
FIG. 13 shows the sensing or following of central sections.
Figures 14, 15:
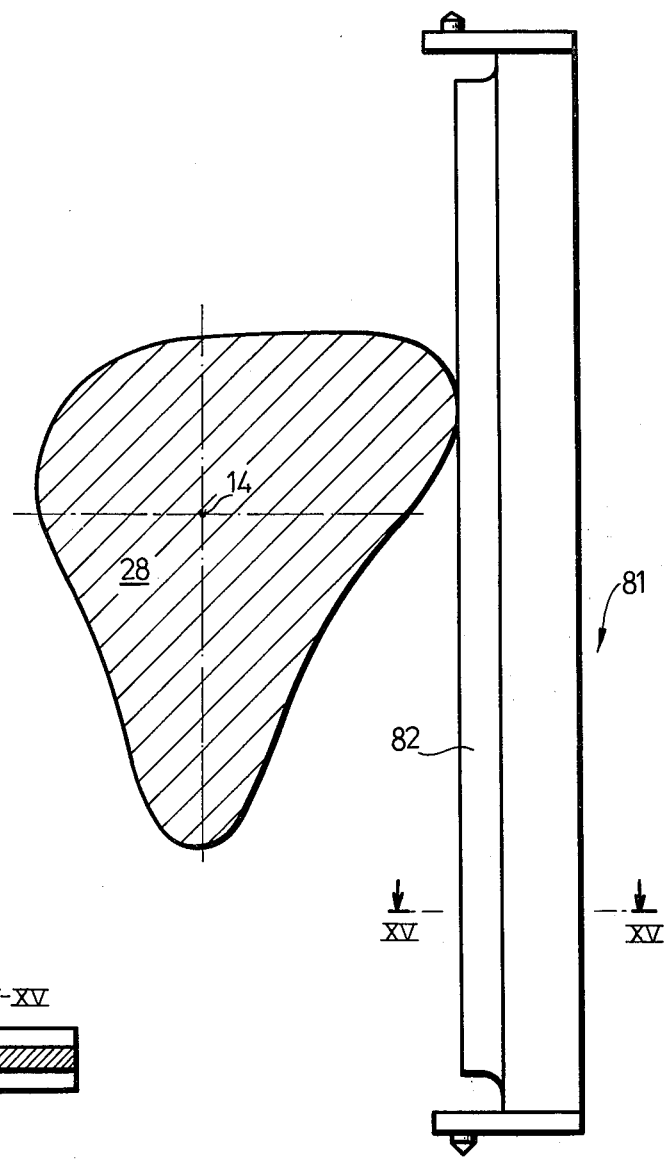
FIG. 14 illustrates the contour sensor.
FIG. 15 is a section taken along the plane XV—XV of FIG. 14 of the contour sensor.

During our control tests, we experienced the fact that the actual series dimensions provide serious scatter and deformation or distortion. Therefore we have had to reach the conclusion that the master lasts were clamped or held in the last-turning lathes along different or non-coincident axes, during the development of a series. To avoid this, a simple solution offers itself, namely to trace on the master last surfaces the trace of the intersecting planes 57b, 57a (see FIG. 13), the intersection of which unambiguously demarcates the position of the axis of rotation in manufacture. This axis is fixed on the plane drawings in both dimensions whereby to ensure subsequent reproducibility.

However, the plane drawings do not or cannot change their dimensions even with the passage of time and it is necessary to store them and to ensure that their position can be reset relative to the coordinate system of the apparatus. To this end, the drawing sheets are mounted on polystyrene intermediate or transmission plates which are connected to the writing table 47 by means of an adjustment pin system. The surface of the polystyrene plates is soluble in synthetic solvents. A sheet of paper laid in this condition on it binds solidly therewith and thus drawings can be made on its surface and the fitting bores bored into the polystyrene plate ensure the reproducibility of the position taken up on the writing table of the apparatus.

Both the vertical and horizontal projections of the last taken about the rotational axis appear in accordance with reality: they intersect each other several times. It is also a practical possibility to prepare drawings of the two compared models on one and the same sheet and thus the lines drawn are very close to each other. In order to enable these drawings to be distinguished from each other, it may be necessary to change the colour of the pen 45. To allow the pen to be rapidly exchanged, a special pen-holder 44 is formed which, after rotation of a lid 67, allows the inserts 45 to be readily changed, mounted or demounted and ensures that the tip of the pen runs over the surface without skipping.

Figure 3:
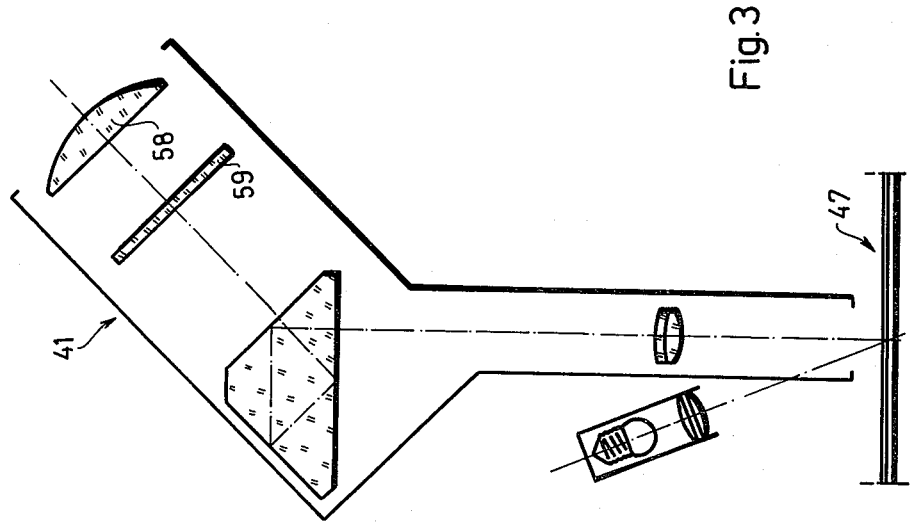
FIG. 3 shows the optical system of an epidiascope or projector, and is a section taken along the plane III—III of FIG. 2.
Figure 4:
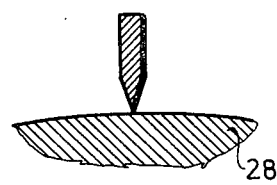
FIG. 4 schematically illustrates the sensor or follower on the surface of the last.
Figure 7:
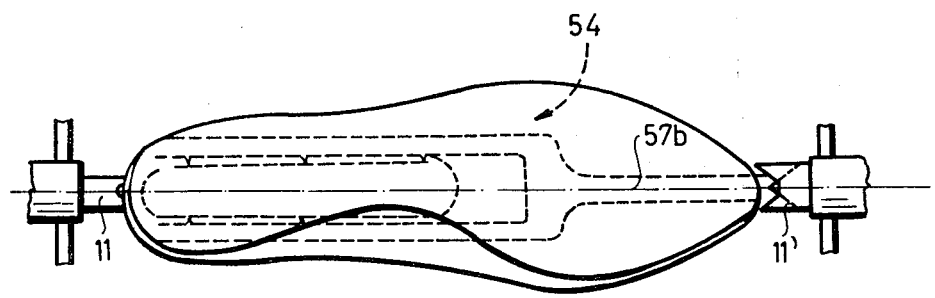
FIG. 7 illustrates in plan view the holding or gripping of the last by means of a stirrup fitted to it.
Figure 12:
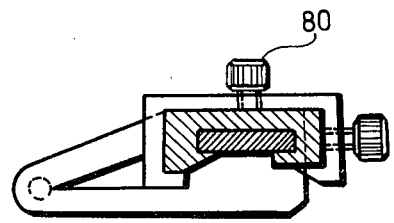
FIG. 12 is a section taken along the plane XII—XII of FIG. 11 to show the sensor or follower for the leading line of the sole.
Figure 8:
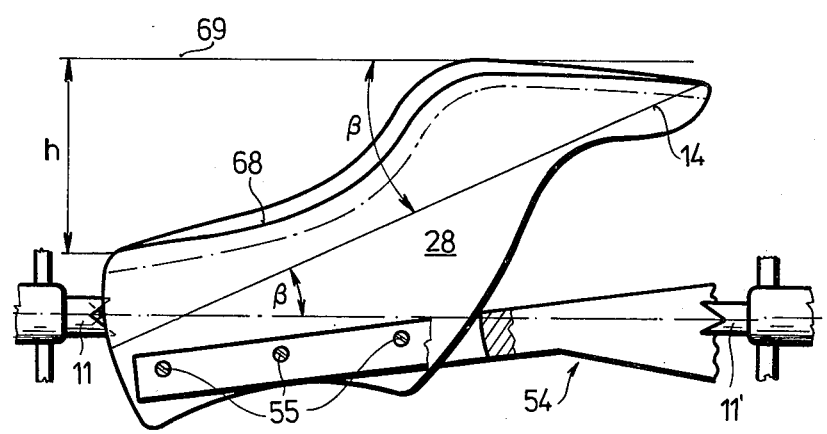
FIG. 8 shows in side elevation the holding or gripping of the last with a stirrup fitted to it.
Figure 11:
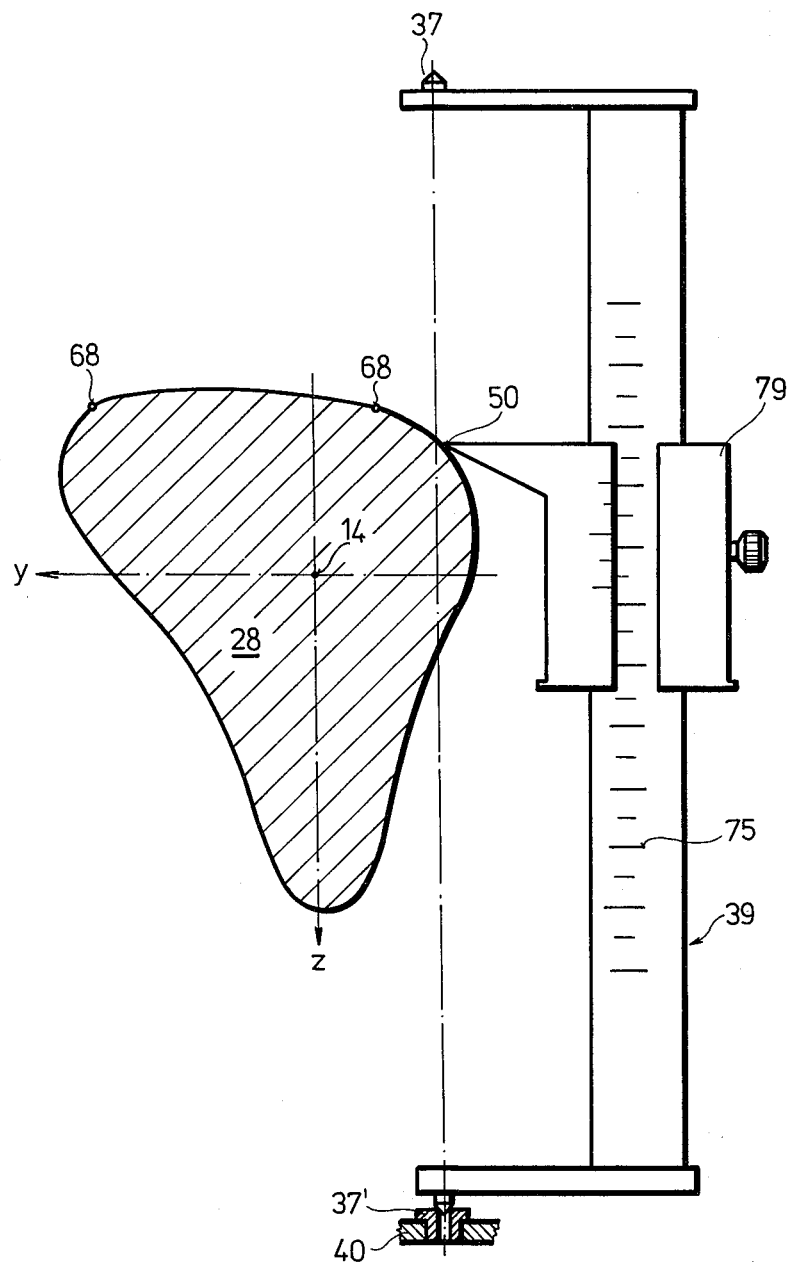
FIG. 11 shows the sensor or follower for the leading line of the sole.

The projector 41 provides a magnified, straight parallax-free picture corrected to different colours and projects it onto a plate provided with non-reflecting or matt annular rings 59 whereby the distinction between the different colours and the identification of individual drawings is ensured. A magnifier 58 further magnifies the projector picture and its sense of relief or depth is eliminated (FIG. 3). A further practical advantage of the apparatus is that it can be complemented by the simple advancing mechanisms shown in FIGS. 8 and 11 to give the most important data for dimensioning the tools for the sole forms. The sole forms have tools complemented with the thickness of the upper part or upper mounted on wood, and these tools connect with the last along the line of the leading edge of the sole 73. In the design of these tools, it is necessary to have a master or template prepared according to the projection on the walking plane of the leading edge line of the sole. This projection requires the last to be held in such a way that the axis of holding or chucking is parallel with the plane of walking, (FIG. 8). In order to allow the last to be held in this position also, it is necessary to mount a stirrup 54 on the crest or top by means of screws 55. To orient the last in this position, one rotates the writing table 47 by an angle $\beta$. Any necessary correction can be effected as described above by means of screws 9. The contour of the leading line of the sole is sensed as shown in FIG. 11. The sensing tip 74 is fitted to the leading line of the sole and by depressing the foot pedal 90, then the position is marked on the paper sheet placed on the writing table 47 by means of the pen actuated by magnet 48. By proceeding along the leading edge of the sole, the process is repeated in a circle from point to point. However, the form sole tools not only match along the leading edge line of the sole, but also they close vertically therefrom at a distance $x_1$, in other words the wood-mounted upper strikes the form sole. The construction of this extremely important closing line takes place by laterally pressing the sensing tip 74 to the surface of the last (FIG. 11), while the tip of the needle 76 is raised to the height of the leading edge contour. This position is inscribed by the foot pedal and the separation is repeated from point to point by advancing along the periphery.

Figure 6:
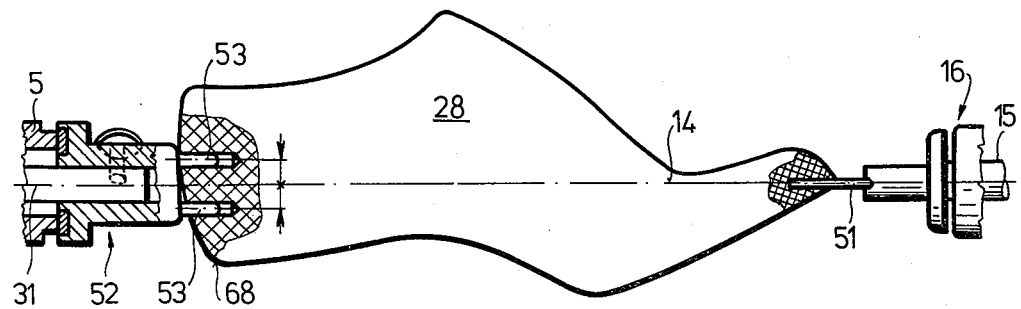
FIG. 6 illustrates the holding or gripping of the last with the aid of ring bores.

FIG. 6 shows a holding or chucking of the last where the last holding devices are replaced by or changed by fixed pins 53, 51. Such a holding and measurement control is required in last manufacture for examining master lasts provided with previously bored or drilled bores. In this case, one then examines whether the axis of rotation, i.e. the holding axis during manufacture, corresponds to the desired spatial direction. The sensed contours and sections are compared with the aid of the projector by drawings and projections fixed on polystyrene plates.

What is claimed is:

1. In a process for the examination of the dimensions of shoe lasts and indicating reference directions for measurement and manufacture of shoe lasts from a master last, wherein a last to be processed is positioned in a last holder and clamped at the heel and tip above a stationary writing table and angularly displaceable at 90°, wherein a feeler senses the position of the last, a writing mechanism records the sensed position, the improvement wherein the position of the last is determined by: preparing horizontal and vertical projections from the master last onto the writing table; sensing with the feeler the spatial positions of appropriate points of surface sections in one plane of the last to be positioned; magnifying the sensed spatial positions and projecting same onto the projections of the master last on the writing table with the writing mechanism, eliminating positional deviations by displacing the last, performing these steps in the plane at at least two mutually different points of maximum mutual separation along important line sections, repeating the process for the plane at right angles to the first mentioned plane by displacing the last holder by 90° and, marking the position and magnitude of the deviations in dimensions on the surface of the last.

2. A process according to claim 1, wherein the step of projecting comprises providing rigid coated planar plates, positioning the plates in an area of examination and removing these plates from the examination area.

3. A process according to claim 1, wherein the line of intersection of projection lines passing through the axis of rotation are marked on the surface of the last in order to mark the location of holding bores for use in the manufacture of footwear.

4. A process according to claim 1, wherein the line of intersection of the projection planes is chosen to be parallel with the plane of walking.

5. An apparatus for examining the dimensions of a shoe last, comprising means for clamping a last both at the heel and at the tip comprising holding tips which are independently adjustable horizontally and vertically to enable the last to be axially displaced, a stationary writing table, means for adjusting the position of the last in the axial direction in a plane parallel to the plane of the writing table, means for obtaining a 90° angular displacement of the last whereby the vertical position may also be brought into a plane parallel with the plane of the writing table, and copying means freely movable into the plane of the writing table and comprising an exchangeable feeler for sensing the position of the last, a writing mechanism for recording the sensed position and a projection for viewing the writing table.

6. The apparatus according to claim 5, wherein the projector comprises annular rings for sensing the magnitude of the displacement and its direction.

7. The apparatus according to claim 5, wherein the copying means comprises a car freely movable in the plane of the writing table and constructed to encompass the last from three sides and having on its free side perpendicular to the plane of movement a plurality of position-sensing feelers which are journalled at both ends thereof.

8. Apparatus according to claim 5, wherein the copying means comprises longitudinal car and a transverse car, a fine-division scale arranged along the paths of the car, means for fixing the cars separately or together in any position thereof, and means for enabling the cars to rotate about an indicated null point of the writing table along an angular scale.

* * * * *